United States Patent
Zhou et al.

(10) Patent No.: US 10,972,570 B2
(45) Date of Patent: Apr. 6, 2021

(54) RESTFUL METHOD AND APPARATUS TO IMPORT CONTENT BY GEO-AWARE CONTENT CACHING SERVICE

(71) Applicant: Open Text Corporation, Waterloo (CA)

(72) Inventors: Wei Zhou, Shanghai (CN); Russell George Teglas, Arlington, MA (US); Siddaram Siddanna Bali, Chittapur (IN); Vinodh Nama Vasudeva, Bangalore (IN)

(73) Assignee: Open Text Corporation, Waterloo (CA)

( * ) Notice: Subject to any disclaimer, the term of this patent is extended or adjusted under 35 U.S.C. 154(b) by 304 days.

(21) Appl. No.: 15/979,241

(22) Filed: May 14, 2018

(65) Prior Publication Data
US 2018/0338014 A1    Nov. 22, 2018

Related U.S. Application Data

(60) Provisional application No. 62/507,325, filed on May 17, 2017.

(51) Int. Cl.
*G06F 15/16* (2006.01)
*H04L 29/08* (2006.01)
(Continued)

(52) U.S. Cl.
CPC .......... *H04L 67/2842* (2013.01); *G06F 9/547* (2013.01); *G06F 16/9537* (2019.01);
(Continued)

(58) Field of Classification Search
CPC .................................................. H04L 67/2842
See application file for complete search history.

(56) References Cited

U.S. PATENT DOCUMENTS

2015/0067029 A1* 3/2015 Rashid .................... H04L 67/42
709/203
2015/0278168 A1* 10/2015 Hawa .................... G06F 16/275
715/205
(Continued)

OTHER PUBLICATIONS

"EMC® Documentum® Documentum Foundation Services," Development Guide, V. 7.2, EMC Corporation, 2015, Chapter 11, pp. 179-204.
(Continued)

*Primary Examiner* — Kevin T Bates
*Assistant Examiner* — Clarence D McCray
(74) *Attorney, Agent, or Firm* — Sprinkle IP Law Group

(57) ABSTRACT

Representational state transfer (REST) based geo-aware content transfer includes a REST server configured for receiving an application programming interface (API) request from a client device. The REST server obtains a upload universal resource locator (URL) targeting a caching server that is geographically closest to the client device, constructs an upload link containing the upload URL and a completion callback, and sends the upload link to the client device. The client device uses the upload URL to upload content to the caching server. The caching server interprets the completion callback to obtain a completion URL and, upon completion of content uploading, makes a REST API call using the completion URL. Responsive to the REST API call, the REST server executes an inbound operation to complete the uploading to a content management system and returns the content URL to the caching server which sends the content URL to the client device.

20 Claims, 6 Drawing Sheets

(51) Int. Cl.
*H04L 29/06* (2006.01)
*G06F 9/54* (2006.01)
*G06F 16/955* (2019.01)
*G06F 16/9537* (2019.01)

(52) U.S. Cl.
CPC .......... *G06F 16/9566* (2019.01); *H04L 67/02* (2013.01); *H04L 67/40* (2013.01)

(56) References Cited

U.S. PATENT DOCUMENTS

2016/0301766 A1* 10/2016 Ionescu ................. G06F 16/172
2017/0344540 A1* 11/2017 Pidduck ................. G06F 16/93

OTHER PUBLICATIONS

"Content Transformation Services with Branch Office Caching Services Setup," DELL/EMC Corporation, Dec. 2016, 27 pages.

* cited by examiner

RESTFUL METHOD AND APPARATUS TO IMPORT CONTENT BY GEO-AWARE CONTENT CACHING SERVICE

CROSS-REFERENCE TO RELATED APPLICATION(S)

This application claims a benefit of priority under 35 U.S.C. § 119(e) from U.S. Provisional Application No. 62/507,325, filed May 17, 2017, entitled "RESTFUL METHOD AND APPARATUS TO IMPORT CONTENT BY GEO-AWARE CONTENT CACHING SERVICE," which is fully incorporated by reference herein for all purposes.

TECHNICAL FIELD

This disclosure relates generally to managing content in a network computing environment. More particularly, this disclosure relates to transferring content in the context of a network-based content management system. Even more particularly, this disclosure relates to a technical solution that supports geo-aware content upload with a RESTful API so that the content can be properly imported into a content repository of a content management system at the backend of an enterprise computing environment.

BACKGROUND OF THE RELATED ART

Content transfer in a content management system refers to the means of uploading or downloading content files between a client machine and a content server for the associated document objects. A content management system usually provides various application programming interfaces (APIs) to enable content transfer, by socket APIs or Web Services, for example. For an organization that has deployed a content management system in its centralized data center and that, at the same time, has a number of large branch offices world-wide, it becomes a challenge for all branch offices to transfer large content files to the centralized content management system stably and efficiently.

SUMMARY OF THE DISCLOSURE

A content management system operating in an enterprise computing environment (e.g., a private network of an enterprise, also referred to as a local area network or LAN) can utilize a caching server configured for providing branching office content services (BOCS) to client devices on the private network. The caching server (referred to hereinafter "BOOS server") can help to transfer content locally on the private network (e.g., to and from a content repository of the content management system) in a synchronous or asynchronous mode and provide geo-aware content upload and download services over the Hypertext Transfer Protocol (HTTP).

For example, when a client needs to create a document in the content management system, the system first creates a document object for capturing metadata associated with the document and then uploads the document thus created to its adjacent BOOS server. In this way, the content upload process can leverage the benefit of a LAN or edge network. The BOOS server can upload the document to a content server at the backend of the LAN asynchronously using its private communication channel with the content server. FIG. 1 depicts an example of this standalone content caching service solution (100).

As illustrated in FIG. 1, the standalone content caching service solution requires a thick client (101a, . . . , 101n) to be installed on the client machine's operating system (OS), where the thick client spawns a separate process to upload the content in the background via a BOOS server (120a, . . . , 120n) to a content server (150) by way of remote procedure calls (RPC) or web services provided by a web server (110). The thick client cannot be deployed on a middleware server and the web server is required to install an agent (111). The agent running on the web server communicates with the thick client to start and report progress on the content transfer. This web server agent is stateful (and hence requires a "sticky" session). Therefore, this solution does not support failover in High Availability (HA) environment. Failover can be important in critical applications where it is important that users continue to have access to an application even if components of the application fail.

Embodiments disclosed herein provide a new technical solution that supports representational state transfer (REST) based geo-aware content upload without requiring any thick client be installed on a client machine. The differences lie not only in the API format, but also in the requirements for client and server deployment. FIG. 2 depicts an example of a new RESTful API-based geo-aware content caching service solution (200) in the context of a network topology. The term "REST" refers to the representational state transfer technology or software architecture, while the term "RESTful" can be used to describe a system, software, or service that implements the REST technology or architecture. The term "RESTful API" is used interchangeably with "REST API" and can refer to a RESTful web service or a set of RESTful web services.

As illustrated in FIG. 2, the new solution provides REST services (230) for a "lite" client (201a, . . . , 201n) to create documents, and has enhanced/advanced BOOS servers (220a, . . . , 220n) that can interact with a REST server (210) using a stateless protocol to store the documents in a content server (250) operating at the backend of a private network (290). In the example of FIG. 2, the thin clients are distributed (e.g., in edge networks 280a, . . . , 280n) and remote from the content server, which resides in a separate LAN (270). On the client side, any HTTP client can be used to upload the content, with no dependency on the client OS or client application framework.

In some embodiments, a REST server receives REST API request from a client device for an upload link, the REST API request containing a network location associated with the client device. In response, the REST server obtains a upload universal resource locator (URL) targeting a caching server that is geographically closest to the client device, constructs an upload link containing the upload URL and a completion callback parameter, and sends the upload link to the client device.

The client device uses the upload URL in the upload link to upload content to the caching server. In response, the caching server interprets the completion callback parameter in the upload link to obtain a completion URL and, upon completion of the uploading of the content from the client device, makes a REST API call to the REST server using the completion URL.

Responsive to the REST API call by the caching server, the REST server executes an inbound operation to complete the uploading to a content management system. In some embodiments, the inbound operation includes associating the content with a content URL in the content management system. The REST server returns the content URL to the caching server which, in turn, sends the content URL to the client device.

In one embodiment, a system may comprise a processor, a non-transitory computer-readable storage medium, and stored instructions translatable by the processor to implement a workflow that can complete a content upload using the method substantially as described herein. Another embodiment comprises a computer program product having a non-transitory computer-readable storage medium storing instructions translatable by a processor to perform a method substantially as described herein. Numerous other embodiments are also possible.

Embodiments disclosed herein can provide many advantages. For example, the new solution does not require the installation of a thick client on a client machine's OS, will work with any HTTP client, and does not utilize a server-side agent so that the REST server can remain stateless.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
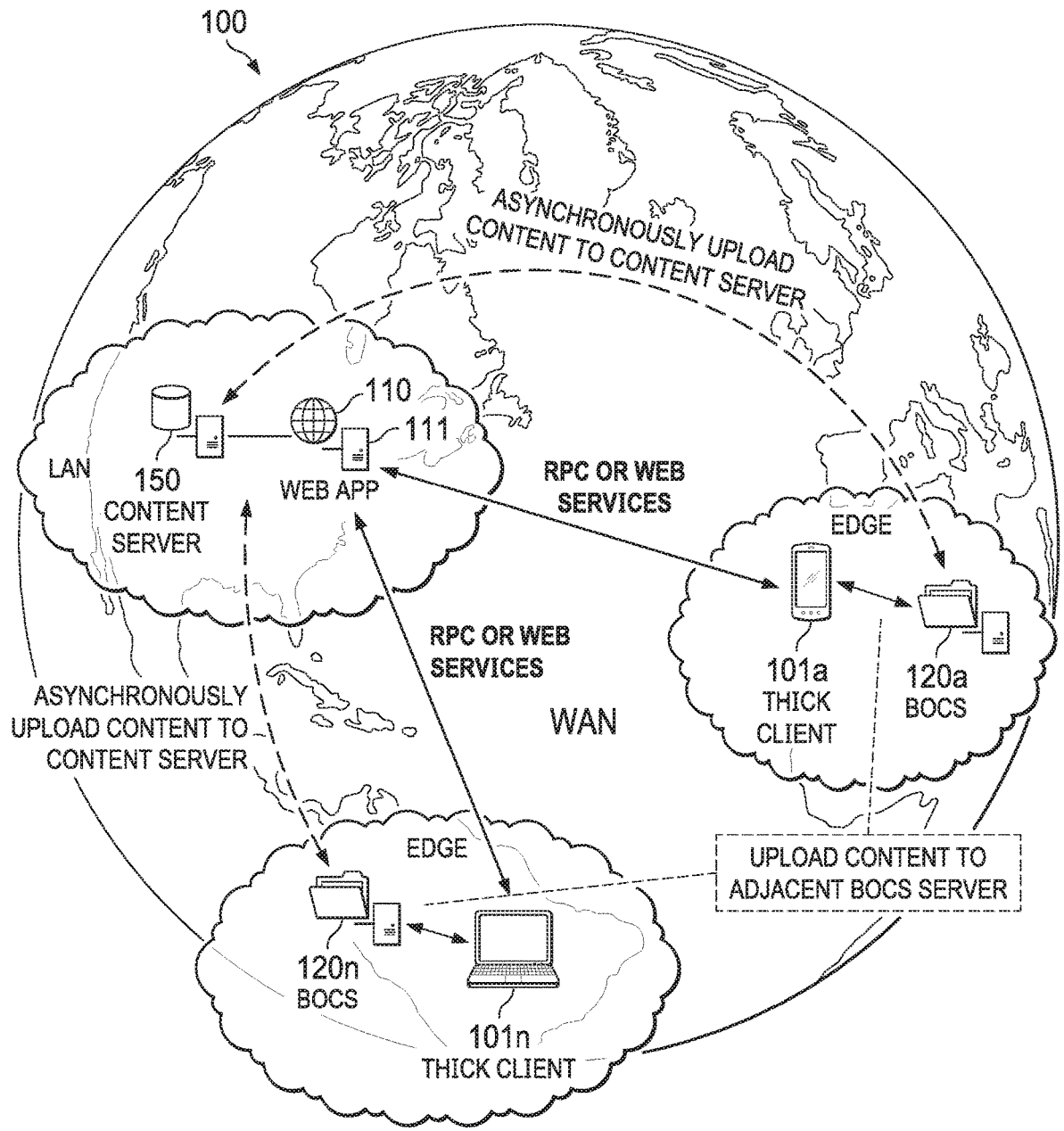
FIG. 1 depicts a diagrammatic representation of an example of a standalone content caching service solution in a computer network environment.
Figure 3:
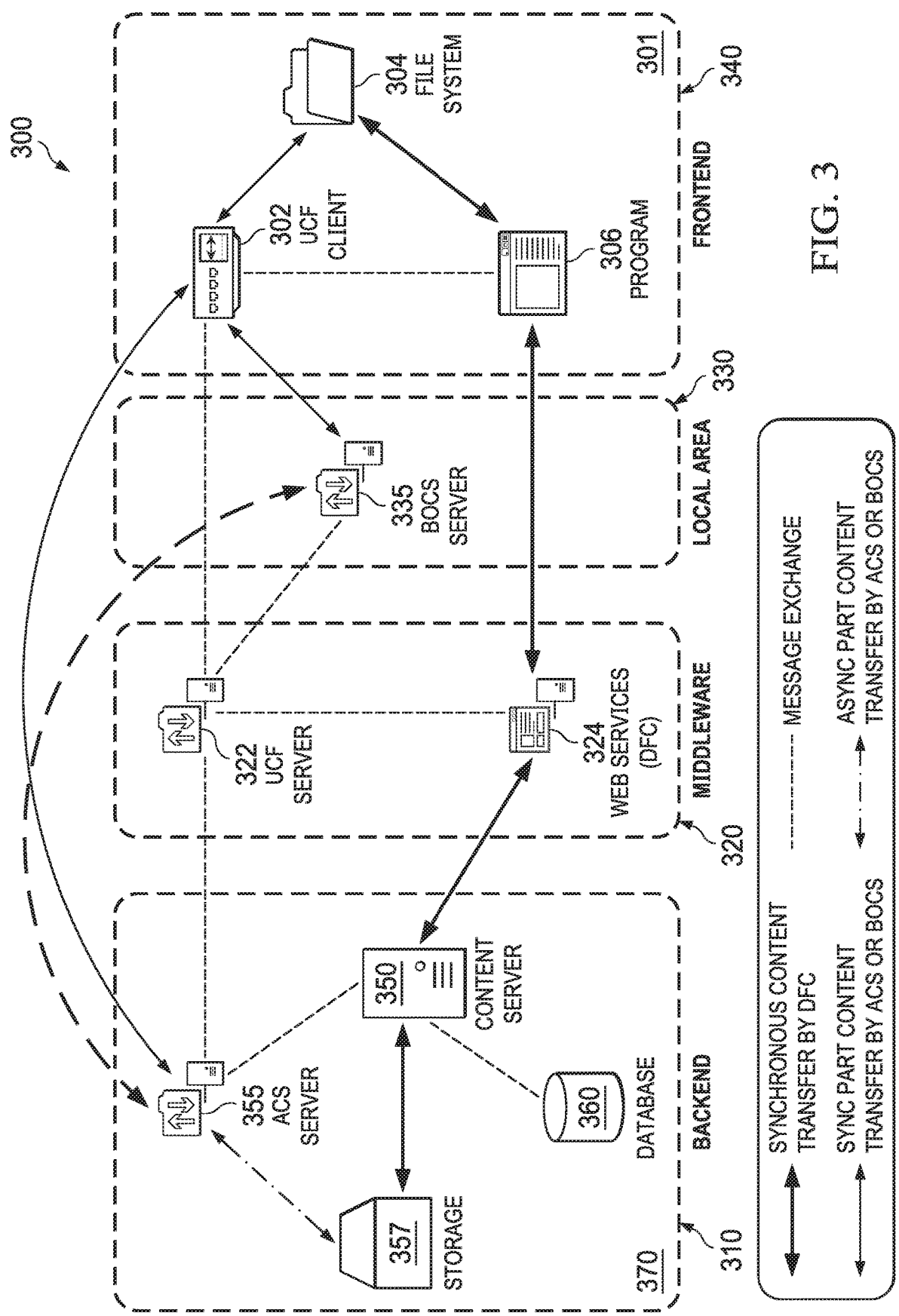
FIG. 3 depicts a diagrammatic representation of example operation of the standalone content caching service solution of FIG. 1.

FIG. 3 depicts a diagrammatic representation of example operation of the standalone content caching service solution of FIG. 1. In this example, enterprise computing environment (e.g., private network 300) can include backend 310 (e.g., LAN 370), middleware 320, local area 330, and frontend 340 (e.g., client device 301). Backend 310 may include content server 350, accelerated content services (ACS) server 355, storage 357, and database 360. Content server 350 may implement a content management system. OpenText™ Documentum™ is an example of a content management system suitable for enterprise content management (ECM).

In ECM, content transfer can involve large files (e.g., tens or hundreds of megabytes). Trying to upload such large files to a content server in a private network can be very difficult and complex. To this end, a web component (e.g., ACS server 355) may be utilized to provide HTTP direct content transfer for data objects. For example, ACS server 355 can facilitate HTTP direct content transfer to storage 357 managed by content server 350, for instance, using database 360.

Accordingly, the standalone content caching service solution shown in FIG. 3 allows for HTTP direct content transfer. However, this HTTP direct content transfer requires middleware 320 which, in this example, includes unified client facilities (UCF) server 322 and content server classes (e.g., Documentum Foundation Classes (DFC)) web services 324. UCF server 322 refers to a one-client-to-one-server component configured for orchestrating content transfer between UCF client 302 and for content server 350. DFC web services 324 implement a Java client with RPC communications to content server 350 for synchronous content transfer.

Content binaries can be transferred in various ways: for instance, using web services that leverage the integration of DFC 324, UCF server 322, and UCF client 302; using DFC API (Java) to upload from client device 301 (e.g., a file stored in file system 304 can be communicated to DFC API through desktop program 306), to DFC 324, to content server 350, then to storage 370, or vice versa for downloading; or using ACS server 355, DFC 324, UCF server 322, BOOS server, 335 UCF client 302 to upload a file from file system 304 through desktop program 306 and ACS server 355 to storage 357, or to download a file from storage 357 through ACS server 355 to desktop program 306 on client device 301. Another way to download a file from storage 370 to desktop program 306 is through ACS server 355 (or BOOS server 335).

Using ACS server 355 and/or BOOS server 335 can significantly accelerate content transfer. However, as illustrated in FIG. 3, this standalone content caching service solution requires UCF server 322 (as middleware 320) and UCF client 302 (on client device 301) if a file is uploaded to ACS server 355 or BOOS server 335.

UCF server 322 and UCF client 302 are designed for content transfer orchestration. The UCF server component (e.g., UCF server 322) is deployed along with DFC (e.g., DFC web services 324) in application servers. The UCF client component (e.g., UCF client 302) is usually deployed as a Java applet or .NET ActiveX plugins to run on an end user's desktop machine (e.g., client device 301). Security concerns may exist as this deployment scenario depends on security technologies implemented on the client device. Generally, UCF components are not supported on mobile devices.

Once a UCF connection is set up between a UCF server and a UCF client, the UCF client must route to the same UCF server for all the communications. This is referred to as "sticky" sessions as the UCF client must stick to the same UCF server. Sticky sessions also do not support HA environment (e.g., a server cluster of systems that are durable and can operate continuously without failure for a long time, useful for fault tolerant, load balancing, speed, etc.). Sticky sessions do not support stateless scaling.

In computing, a stateless protocol refers to a communications protocol that treats each request as an independent transaction that is unrelated to any previous request so that the communication consists of independent pairs of request and response. A stateless protocol does not require the server to retain session information or status about each communications partner for the duration of multiple requests (and hence is "stateless"). In contrast, a protocol that requires keeping of the internal state on the server is referred to as a stateful protocol. Skilled artisans understand that stateless is one of the architectural constraints of a REST architecture. REST or RESTful web services are one way of providing interoperability between computer systems on the Internet. REST-compliant web services allow requesting systems to access and manipulate textual representations of web resources using a uniform and predefined set of stateless operations.

Leveraging the REST architecture, this disclosure provides systems, methods, and apparatuses for importing (or uploading, from the perspective of a client) content via RESTful geo-aware content caching services. In some embodiments, a REST server provides REST services for a client to create documents. The REST server interacts with enhanced/advanced BOOS servers via a stateless protocol, allowing a content upload workflow to be completed using a REST API.

Figure 2:
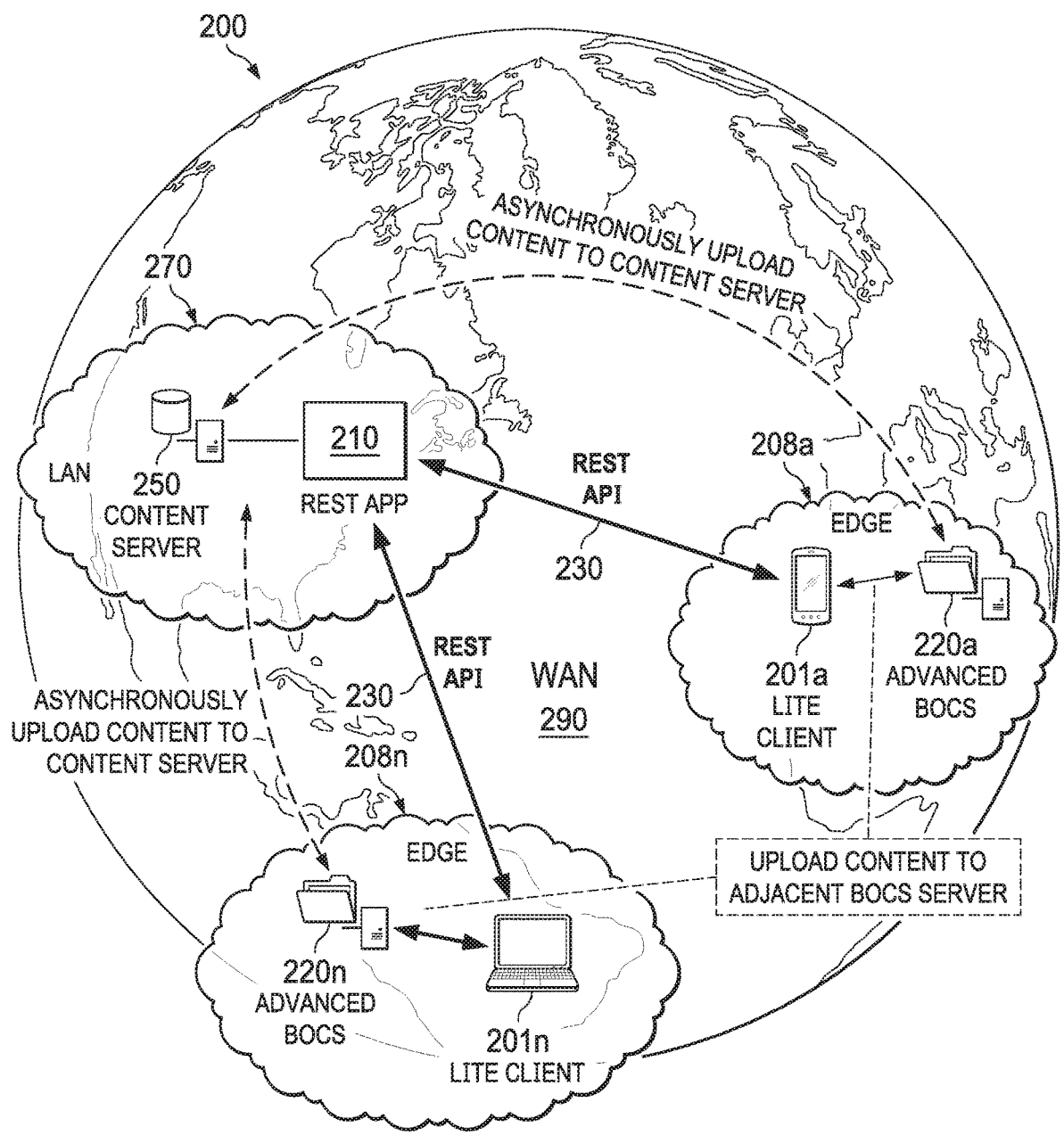
FIG. 2 depicts a diagrammatic representation of an example of a new and improved REST based geo-aware content caching service solution in the context of a network topology according to some embodiments.
Figure 4:
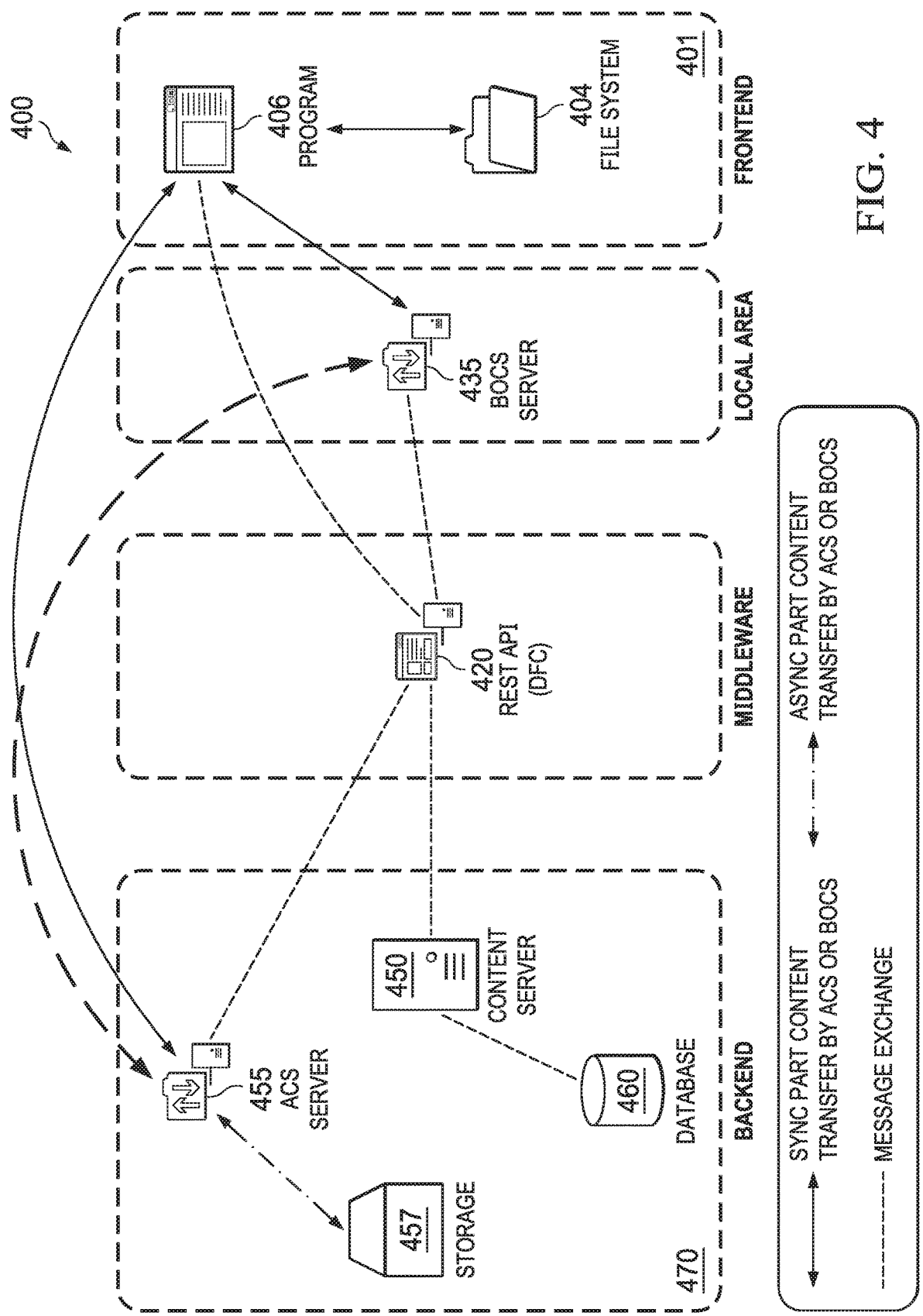
FIG. 4 depicts a diagrammatic representation of example operation of the REST based geo-aware content caching service solution of FIG. 2 according to some embodiments.

FIG. 4 depicts a diagrammatic representation of example operation of the REST based geo-aware content caching service solution of FIG. 2 according to some embodiments. As illustrated in FIG. 4, the REST based geo-aware content caching service solution can leverage ECM components already exist in an enterprise computing environment 400. That is, content server 450, ACS server 455, storage 457, database 460, BOOS server 435, program 406, and file system 404 can implement, respectively, content server 350, ACS server 355, storage 357, database 360, BOOS server 335, program 306, and file system 304 described above. However, no UCF components are needed. Rather, the ECM components are modified or otherwise enhanced for communicating and interacting with REST server 420 for DFC services over a RESTful API.

The REST based geo-aware content caching service solution can provide several technical advantages. For example, middleware servers (e.g., DFC servers) can horizontally scale with HA support and any clients with an HTTP library can consume the distributed content transfer REST API. In this way, a request client can upload content directly to a caching server (e.g., BOCS server 435) that is local or geographically the closest to the request client and no longer has to wait for a content server to respond and complete its upload operation. This is an advantage because it shields the client from the complexity of content server operations. Typically, when a request to create a document in a content management system, the content server has to create a system object (e.g., "sysobject") in a backend repository that will hold the metadata associated with the document (e.g., create a row in a relational database management system). As an example, a sysobject can be comprised of a set of attributes and a list of contents.

Asynchronously, when the document is transported from the client to the backend, that document needs to be associated with the object at the backend repository for various purposes (e.g., versioning, access controlling, etc.). ECM is rich in metadata, all of which have to be managed and associated with the document once the document made it to the content server. The complexity of the content server operations lies in where the document resides in the content server and how the content server associates the document with all the metadata (e.g., title, subject, author, keywords, etc.). With the REST based geo-aware content caching service solution, all this complexity is decoupled from and opaque to the client.

For example, in FIG. 4, from the perspective of client device 401, all it needs to do to upload a file from file system to 404 is to make a REST API call through program 406 to REST server 420, get an upload URL from REST server 420, and upload the file from file system 404 to a server (e.g., BOCS server 435) through program 406. The client device does not need to know that the server, to which the file is uploaded, is a caching server (e.g., BOCS server 435) that is geographically the closest to it, or that the caching server, the REST server, and the content server work in concert to complete the rest of content upload to the backend.

Figure 5:
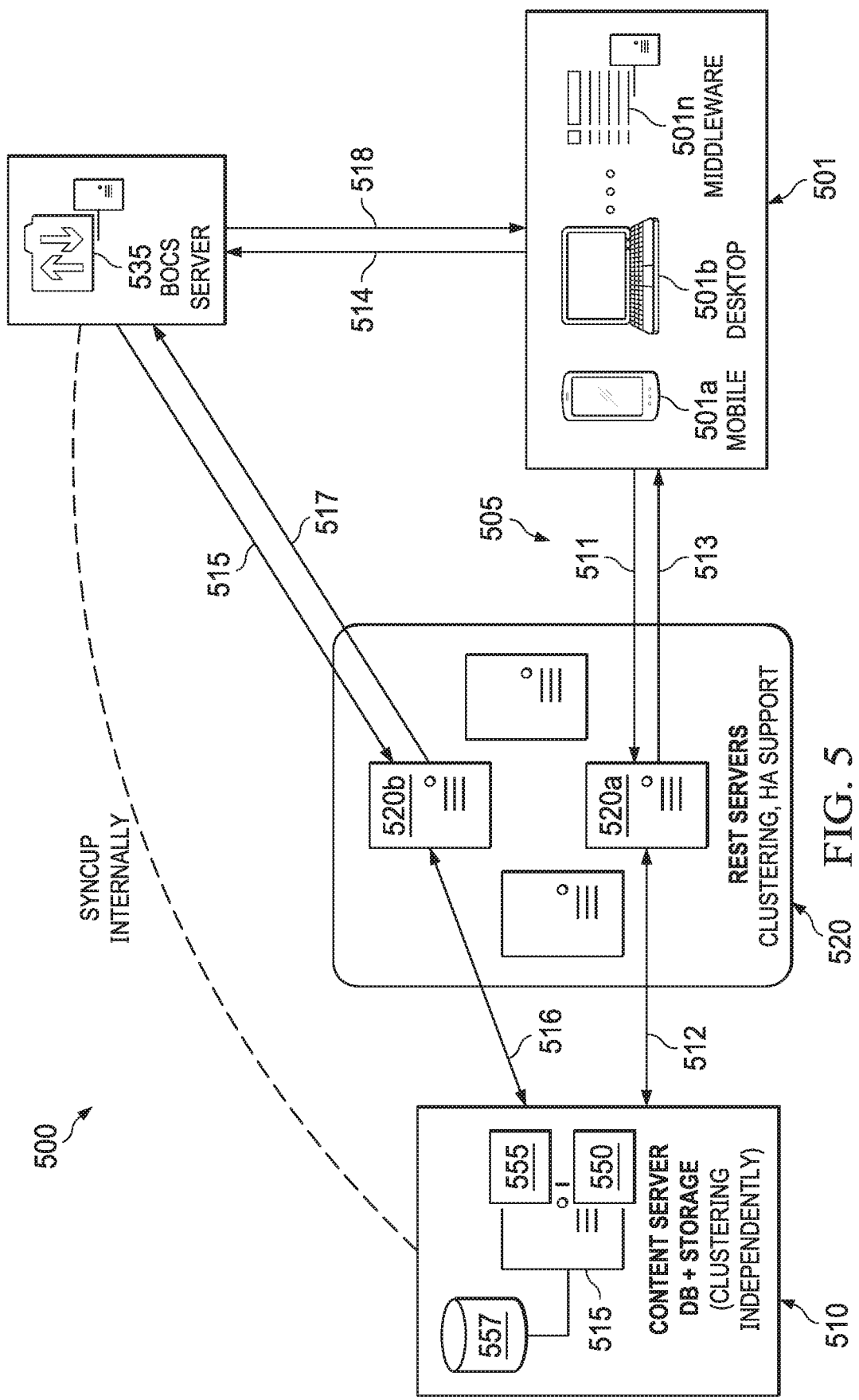
FIG. 5 depicts a diagrammatic representation of an example of a workflow that can complete a content upload using the REST based geo-aware content caching service solution of FIG. 2 according to some embodiments.

FIG. 5 depicts an example of content upload workflow 505 in which content (e.g., a file or document) is uploaded from any HTTP client 501 (e.g., client device 501a, . . . , 501n, which can include a variety of user devices such as mobile phones, smart phones, laptop computers, tablet computers, desktop computers, etc., as well as middleware servers) to content server 550 at backend 510 (e.g., a LAN in enterprise computing environment 500) through REST server 520a (or any server in REST server cluster or middleware 520). The steps enumerated in FIG. 5 are as follows:

HTTP client 501 asks REST server 520a for an ACS/BOCS upload URL, by way of a REST API request (511). In one embodiments, such an upload URL can refer to an ACS/BOCS upload URL because such an upload operation involves BOC server 535 and ACS server 555. As illustrated in FIG. 5, in some embodiments, ACS server is co-located with content server 550 on server machine 515 to facilitate content transfer to and from storage 557 (which is an example of a content repository managed by content serer 550).

In some embodiments, in response to the REST API request from the HTTP client, the REST server authenticates the REST API request against the content server. The HTTP client provides, in the REST API request, information that the REST server requires to construct an upload URL. Required information may include a network location associated with the client device (on which the HTTP client is running) and any other required metadata such as the size of the file to be uploaded. Optionally, the client may provide all the necessary metadata for the document creation since it may not communicate back to the REST server again before the upload completion.

In some embodiments, responsive to the REST API request from HTTP client 501, REST server 520a makes a backend call to obtain a BOOS upload URL (512). Optionally, a network location (e.g., the network location associated with the client device) is provided to choose an appropriate advanced BOOS server. Referring back to FIG. 2, in a distributed enterprise computing environment (e.g., WAN 290), there can be multiple advanced BOOS servers. Accordingly, when a network location is provided, ACS server 555 may access a database or storage location and retrieve a list of advanced BOOS servers with their corresponding geographical locations and operate to determine an appropriate BOOS server from the multiple advanced BOOS servers based on the given network location (e.g., by mapping the network location to a BOOS server that is geographically the closest to the network location), and provide same to REST server 520a (e.g., a BOOS server that is geographically the closest to the network location or a list of BOOS servers sorted by their respective geographic proximity to the network location). In one embodiment, ACS server 555 may access a database or storage location and retrieve a list of advanced BOOS servers with their corresponding geographical locations and provide same to REST server 520a which, in turn, maps the network location to a BOOS server that is geographically the closest to the network location. In some embodiments, REST server 520a can set a timeout condition (e.g., less than 30 seconds) on the provided upload URL which is used only once.

REST server 520a then generates or otherwise constructs a response (e.g., an upload link) to respond to the REST API request from HTTP client 501 (513). The response constructed by REST server 520a contains the upload URL. In one embodiment, to comply with the HTTP/1.1, the upload URL is placed in the response "Location" header. In the response, REST server 520a also puts or embeds a content completion callback URL (referred to hereinafter as the completion URL) in the upload URL as a query parameter. The completion URL is used by BOOS server 535 to call back to REST server 520a upon upload completion.

In some embodiments, the completion URL is encrypted so the client cannot view or modify it. In some embodiments, the REST server returns a document result in REST format which contains the upload URL.

Once HTTP client 501 has the upload URL from REST server 520a, it uploads the content to BOOS server 535 using the upload URL (514). In this case, no authentication is required. BOOS server 535 is operable to check the file size and other necessary metadata integrity. BOOS server 535 is also operable decrypt the completion URL in the upload URL and calls back (e.g., making a REST API call) to REST server 520a (515).

As discussed above, REST server 520a may operate in a cluster environment and, thus, the REST server node (e.g., REST server 520a) that makes up the upload URL can be different than the REST server node (e.g., REST server 520b) that accepts the completion URL. This is possible because these sessions are stateless—the HTTP client is not required to stick to a particular REST server.

In the example of FIG. 5, REST server 520b accepts the REST API call from BOOS server 535 and executes the appropriate inbound operation to complete the upload (516). How the user credential is supplied for the inbound operation can be up to the REST server when it creates the completion URL and can be opaque to the BOOS server and to the client. The BOOS server response can be consumed by the inbound operation running on the REST server that binds the uploaded content with its associated document in storage 557 managed by content server 550 (a content management system).

Once the content is uploaded to the content management system, the REST server responds to the BOOS server (517). Optionally, the REST server creates a new document resource URL and sends it back to the BOOS server for confirmation. In turn, the BOOS server responds to the client (518). In one embodiment, BOOS server 535 returns an operation status to client device 501.

Below are example DFC and ACS APIs that support ACS and BOOS content write.
API:

String getACSWriteURL(fileLength, format, networkLocation, completionURLLink, contentURLOptions);

Usage: Get an ACS content write URL for a sysobject. Any generic client can make a POST to this URL to import a content file. The sysobject can either be contentless or contentful at the moment to generate ACS write URL. It supports to get a BOOS content write URL when the right network location is specified. The success of the write URL generation locks the sysobject by the current visitor.
API:
IDfSysObject completeACSWriteURL(InputStream inputStream, int resultIndex);

Usage: Complete the ACS or BOOS content write with the ACS or BOOS completion request. The input stream is the ACS or BOOS completion request body. The success of the write completion unlocks the sysobject.

The new capability of DFC and ACS APIs provides the possibility to integrate ACS and BOOS write in a REST API. ACS and BOOS content URL is for anonymous access, with a default expiration duration of, for example, six hours. The read URL supports HTTP GET method and the write URL supports HTTP POST method.

Here are some examples:
Content read URL:

http://10.62.87.94:9080/ACS/servlet/ACS?command=read&version=2.3&docbaseid=00000b&basepath=C%3A%5CDocumentum%5Cdata%5CACME01%5Ccontent_storage_01%5C0000000b&filepath=80%5C00%5C37%5Cd7.txt&objectid=0900000b8002de4e&cacheid=dAAEAgA%3D%3D1zcAgA%3D%3D&format=text&pagenum=0&signature=K5qJTOwldcVSzUabfA31%2BdX235Ma74ilItk6ES5cyvT1UR8qqJAOFGJWzhAwSJ1wx2Po7Oh8ZbSFklvOv6BA17wyp4%2BEefAoRcwogYBFSid2BUhj9FLv3CL88egY1np4ut8vPasgxbqYfo6tKOPtUBFZEqwXudBBFVDi5wXJz0c%3D&servername=RESTCS73IRACS1&mode=1&timestamp=1475146131&length=10&mime_type=text%2Fplain&parallel_streaming=true&expire_delta=360

Content write URL:

```
http://10.62.87.94:9080/ACS/servlet/ACS?command=write&version=2
.3&docbaseid=00000b&content_objid=0600000b8000cff6&formatid=270
0000b800001d8&storeid=2800000b80000100&store_data=ro0ABXNyADxjb
20uZG9jdW1lbnR1bS5mYy5jbGllbnQuY29udGVudC5pbXBsLkNvbnRlbnRTdG9y
%0AZXJFeHRyYURhdGH79InsRDaodAwAAHhwc3IAPGNvbS5kb2N1bWVudHVtLmZj
LmNsaWVudC5pbXBs%0ALnR5cGVkZGF0YS5EeW5hbWljYWxseVR5cGVkRGF0YQ2y
OjPtw7IzDAAAeHIAMWNvbS5kb2N1bWVudHVtLmZjLmNsaWVudC5pbXBsLnR5
cGVkZGF0YS5UeXBlZERhdGFS%2BJtNFLR32QwAAHhyADljb20u%0AZG9jdW1lbn
R1bS5mYy5jbGllbnQuaW1wbC50eXBlZGRhdGEuQWJzdHJhY3RUeXBlZERhdGHPX
WpF%0AKoIAXQwAAHhwdAAQMDAwMDAwMDAwMDAwMHcKAAAAAAAAAAAAAXNyA
DBjb20uZG9jdW1lbnR1%0AbS5mYy5jbGllbnQuaW1wbC50eXBlZGRhdGEuTGl0Z
VR5cGVv8Ld%2FWu0npgwAAHhwdXIANFtMY29t%0ALmRvY3VtZW50dW0uZmMuY2x
pZW50LmltcGwudHlwZWRkYXRhLkF0dHJpYnV0ZTtORMuIE81SggIA%0AAHhwAAA
AAHQAAHNyABFqYXZhLmxhbmcuSW50ZWdlchLioKT3gYc4AgABSQAFdmFsdWVV4cg
AQamF2%0AYS5sYW5nLk51bWJlcoaslROLl0CLAgAAeHAAAAAAcHBwc3IAEWphdm
EubGFuZy5Cb29sZWFuzSBy%0AgNWc%2Bu4CAAFaAAV2YWx1ZXhwAHhzcgATamF2
YS51dGlsLkFycmF5TGlzdHiB0h2Zx2GdAwABSQAE%0Ac216ZXhwAAAAAHcEAAAA
AHh4eA%3D%3D&partition=0&signature=NFpsoYYoYpUgOgLG31%2FA7ge7SG
2VIkuFSZRfx1pxMaJgIK9FfCd3%2FW1RpD9k3Ymukyk5XBjTriOxN7rC%2BZpZZ
76%2FkTxZ38DsbNrJuczI%2BzqRx5Zpk%2BE3HA1yvGoXxvAzRmqUj%2FqU5LqC
tOnjB1%2FOyszdOOSOQsUasy0A6DAiCgA%3D&servername=RESTCS73IRACS1&
mode=2&timestamp=1475146613&length=10&parallel_streaming=true&e
xpire_delta=360
```

REST API Use Cases

Examples of use cases for BOOS content uploading in a content management system can include the following:

User Dave wants to create a new contentful document. He creates the document object using the REST API, but wants to upload a (large) content file associated with this document via an adjacent BOOS server asynchronously.

User Dave has an existing document. He wants to check in a new version of, or overwrite the existing content, via an adjacent BOOS server asynchronously.

The ACS or BOOS content write requires two HTTP calls at the client side. One REST call is made to the REST server to obtain the content write URL during document creation or checkout. Another HTTP call (an HTTP POST) to the ACS server or the BOOS server to complete the content upload.

The ACS or BOOS content write URL can be a new link relation. When there are multiple ACS or BOOS content write URLs, link title can be used to distinguish them.

Non-limiting examples are provided below:

```
{"rel":"http://identifiers.company.com/linkrel/distributed-
upload", "title":"ACS","href":"http://ACS-
SERVER:9080/ACS/servlet/ACS?command=write&XXX"}
{"rel":"http://identifiers.company.com/linkrel/distributed-
upload", "title":"BOCS-Abuja","href":"http://ACS-
SERVER:9080/ACS/servlet/BOCS?command=write&XXX"}
```

Getting an ACS content write URL would lock the sysobject, so GET methods cannot be used to retrieve the URL. Embodiments may support retrieving ACS content write URL in below resources:
  Create a new contentless document under folder child documents resource (RADL>>)
  Create a new contentless sysobject under folder child objects resource (RADL>>)
  Checkout a sysobject resource (RADL>>)

In any of above resources, the sysobject is locked after the ACS or BOOS content write URL is generated. When the client completes content upload to the ACS or BOOS server, the sysobject's lock will automatically be removed.

In some embodiments, new URI query parameters are designed for ACS content write URL generation. These are provided in Table 1 below.

TABLE 1

| Param Name | Data Type | Description |
| --- | --- | --- |
| require-dc-write | boolean | Specifies whether to require distributed content write. It is used in POST@FolderChildDocuments Resource, POST@FolderChildObjects Resource, and PUT@Lock Resource. |
| format | string | Content format for the new content to upload. Takes effect only when require-dc-write is true. |
| content-length | long | Content length for the new content to upload. Takes effect only when require-dc-write is true. |
| network-location | string | Specifies the defined network location close to the client geo location. It is used to get BOOS content write URL. Takes effect only when require-dc-write is true. |

Below are REST samples from the client side to make the requests.

Sample 1—Obtain an ACS write URL during document creation:

```
----------------------- Request -----------------------
> POST /dctm-rest/repositories/ACME01/folders/0c00000b80001521/documents?Pre
quire-dc-write=true&format=text&content-length=10 HTTP/1.1
> authorization: Basic ZG1hZG1pbjpwYXNzd29yZA==
> Content-Type: application/vnd.company.cs+json;charset=UTF-8
> accept: */*
   {"properties" : {"object_name": "testdoc.txt"}}
----------------------- Response -----------------------
< Status Code: 201
< Location: http://localhost:8080/dctm-rest/repositories/ACME01/objects/0900000b8002de4e
< Content-Type: application/vnd.company.cs+json;charset=UTF-8
   {
      "name":"object",
      "type":"dm_document",
      "definition":"http://localhost:8080/dctm-rest/repositories/ACME01/types/dm_document",
      "properties":{
         "object_name":"testdoc.txt",
         "r_object_type":"dm_document",
         ...,
         "r_object_id":"0900000b8002de4e"},
      "links": [
         {"rel":"self","href":"xxx"},
         ...,
{"rel":"http://identifiers.company.com/linkrel/distributed-upload","title":"ACS","href":"http://BOCS-SERVER?
command=write&version=2.3&docbaseid=00000b&content_ objid=0600000
b8000parallel_streaming=true&expire_delta=360& completionUrl=aHR0
cDovLzEwLjE3MS43NC4yMzo4mVzdC9kYy1jb21wbGV0aW9uP2RjLXRva2VuPVYwe
E1VRnBRTUZWRVEwNHZjbXREYVdkYVJDczRUM1JZsNVVEVTBlRTE0YWtaTGNYWk5S
ekUzVTB0TGIxQklTek5qVFhKdlRHNWFVV1p5Ym1oS0wwaElkV2wyYlZWclptVjJW
MWcyYzB4dFpHZ3pTVXRvYTFWc1kyWXhjalI0UWpFMlNXTjZZVzExY2pZclVpOTZT
RUY2YW14cWJVZFdVa3R3Wnow0Q=="},
         ...
      ]
   }
```

Sample 2—Obtain ACS write URL during document checkout:

```
----------------------- Request -----------------------
> PUT /dctm-rest/repositories/ACME01/objects/0900000b8002de4e/lock?require
-dc-write=true&format=text&content-length=10 HTTP/1.1
> authorization: Basic ZG1hZG1pbjpwYXNzd29yZA==
> accept: */*
----------------------- Response -----------------------
< Status Code: 200
< Content-Type: application/vnd.company.cs+json;charset=UTF-8
{
      "name":"object",
      "type":"dm_document",
      "definition":"http://localhost:8080/dctm-rest/repositories/ACME01/types/dm_document",
      "properties":{
         "object_name":"testdoc.txt",
         "r_object_type":"dm_document",
         ...,
         "r_object_id":"0900000b8002de4e"},
      "links": [
         {"rel":"self","href":"xxx"},
         ...,
         {"rel":"http://identifiers.company.com/linkrel/distributed-upload","title":"ACS","href":"http://ACS-SERVER:9080/ACS/servlet/ACS?
command=write&version=2.3&docbaseid=00000b&content_objid=06000
00b8000cff4&formatid=2700000b800001d8&storeid=2800000b80000100
&store_data=rO0ABXNyADxjb20uZG9jdW1lbnRlbS5mYy5jbGllbnQuY29udG
VudC5pbXBsLkNvbnRlbnRTdG9y%0AZXJFeHRyYURhdGH79InsRDaodAwAAHhwc
3IAPGNvbS5kb2N1bWVudHVtLmZjLmNsaWVudC5pbXBs%0ALnR5cGVkZGF0YS5E
```

-continued eW5hbWljYWxseVR5cGVkRGF0YQ2yOjPtw7IzDAAAeHIAMWNvbS5kb2N1bWVu%0
AdHVtLmZjLmNsaW

...
 ]
}

Sample 3—Upload content "hello, jo!" to a BOOS server:

----------------------- Request -----------------------
> POST http://BOCS-SERVER?
command=write&version=2.3&docbaseid=00000b&content_objid=0600000
b8000parallel_streaming=true&expire_delta=360&completionUrl=aHR0
cDovLzEwLjE3MS43NC4yMzo4mVzdC9kYy1jb21wbGV0aW9uP2RjLXRva2VuPVYwe
E1VRnBRTUZWRVEwNHZjbXREYVdkYVJDczRUM1JZsNVVEVTBlRTE0YWtaTGNYWk5S
ekUzVTB0TGIxQklTek5qVFhKdlRHNWFVV1p5Ym1oS0wwaElkV2wyYlZWclptVjJW
MWcyYzB4dFpHZ3pTVXRvYTFWc1kyWXhjaII0UWpFMlNXTjZZVzExY2pZclVppOTZT
RUY2YW14cWJVZFdVa3R3WnowOQ== HTTP/1.1
> content-type: application/octet-stream
hello, jo!
----------------------- Response -----------------------
< Status Code: 200

Sample 4—Upload content "hello, jo!" to an ACS server:

----------------------- Request -----------------------
> POST http://ACS-
SERVER:9080/ACS/servlet/ACS?command=write&xxx HTTP/1.1
> content-type: application/octet-stream
command=write&version=2.3&docbaseid=00000b&content_objid=0600000b
8000cff4&formatid=2700000b800001d8&storeid=2800000b80000100&stor
e_data=rO0ABXNyADxjb20uZG9jdW1lbnR1bS5mYy5jbGllbnQuY29udGVudC5pbX
BsLkNvbnRlbnRTdG9y%0AZXJFeHRyYURhdGFH79InsRDaodAwAAHhwc3IAPGNvbS5
kb2N1bWVudHVtLmZjLmNsaWVudC5pbXBs%0ALnR5cGVkZGF0YS5EeW5hbWljYWxse
VR5cGVkRGF0YQ2yOjPtw7IzDAAAeHIAMWNvbS5kb2N1bWVu%0AdHVtLmZjLmNsaW
VudC5pbXBsLnR5cGVkZGF0YS5UeXBlZERhdGFS%2BJtNFLR32QwAAHhyADljb20u%
0AZG9jdW1lbnR1bS5mYy5jbGllbnQuaW1wbC50eXBlZGRhdGEuQWJzdHJhY3RUeX
BlZERhdGHPXWpF%0AKoIAXQwAAHhwdAAQMDAwMDAwMDAwMDAwMHcKAAAAAAAA
AAAAAXNyADBjb20uZG9jdW1lbnR1%0AbS5mYy5jbGllbnQuaW1wbC50eXBlZGRhd
GEuTGl0ZVR5cGVv%2FWu0npgwAAHhwdXIANFtMY29t%0ALmRvY3VtZW50dW0uZ
mMuY2xpZW50LmltcGwudHlwZWRkYXRhLkF0dHJpYnV0ZTtORMuIE81SggIA%0AAH
hwAAAAAHQAAHNyABFqYXZhLmxhbmcuSW50ZWdlchLioKT3gYc4AgABSQAFdmFsdWV
4cgAQamF2%0AYS5sYW5nLk51bWJlcoaslR0LIOCLAgAAeHAAAAAAcHBwc3IAEWph
dmEubGFuZy5Cb29sZWFuzSByB0%0AgNWc%2Bu4CAAFaAAV2YWx1ZXhwAHhzcgATamF
YS51dGlsLkFycmF5TGlzdHiB0h2Zx2GdAwABSQAE%0Ac2l6ZXhwAAAAAHcEAAAAA
Hh4eA%3D%3D&partition=0&signature=Dmy5ItBxtWCpLULlEK2yrgWFyaY51qU
ERr3GZb8Mq3%2FrGQDV622n%2F2VQl24srseiXjFAz4J1qquJHXdnmEgV1Dr%2B2
BlMXuCHJivC1Ir2JPLtLUoOYq0M2y0TNw58YevpFuJlZ%2F5l4oj%2F%2F0%2F%2B
NmnsYMxfN%2FZMlvho4yyYS6aPYk8%3D&servername=RESTCS73IRACS1&mode=
2×tamp=1475146410&length=10&parallel_streaming=true&expire_d
elta=360&completionUrl=aHR0cDovLzEwLjE3MS43NC4yMzo4MDgwL2RjdG0tc
mVzdC9kYy1jb21wbGV0aW9uP2RjLXRva2VuPVYweE1VRnBRTUZWRVEwNHZjbXREYV
dkYVJDczRUM1JTUjB0T1FUQmxLM0ZoTVhZMkt6RjVWR1Z3YmpZMU5EVTJjQ3RKTT
FBek5ISnZkVXRxWmtWaGFGqTkpZVWRPWmxkb0wxWTFTUzlKZDJjNFdWVlVlblZlWl
Z2sSk1GUnNTaXRLVXW1abVEwUXhSWw0VURKV01uWjVkME5KY25GM2NpOXFNRk5MFV
GUFdFbE5TV2hPV1VnM1FYbFpWM0pSTW1sUlIrUkZaak5aZVVVvM01WUJhkVWhzYVRC
T2NrVTRTblIxU2xsSdVpHdGFjMVl3V0RSelJteDUFabVptTnpsQ1lsWjJOell2VldS
MmRFUjNhWEkzYjJaTllXTTNka2R6R6V1ZOTVduSnddha3c0VDNsTmRFUXNMMnROZDNNKb
2VFcDBSRFZrTUd3MWFFTllVRVYyWjFFCaFlqZHpVVFZxZFVsSE5aDVhVEZDUhRN
WVUVm9OV0ZJTjNmeFZUbDJMMDlPWlVGSE9GZzBOekJUUU21kaU1saHRReloxUlhjm
FzVTROaXRGYldaaFNzNVZRMmwzZVRsSWTZyEtVaXQ0WlRKTk9YTlZjRVpWU0VJNF
ZEVmlRakdJDY1VSemJuaDVhMHhGVFRWMldiRmhPRTQzVGxV1JXR1NV1b1UxVlVkblR
GSlhTVk5TU1VSSE9UVXITVkZqVlZQMGFWbHRVVpzTWpCT2RJWXpTbFJyT0hKSU5
HeFpjVmRJWkhoblUxUm5WRGRPRlRlhKaFVZJWkRRPRk5FUWxOaWNRNETXdaaZVRUlc4dlZ6
aFRiVi2Q0VGxkQ1EyVkRlVWxssZWs1MlJprWTJhR1FyZFRoalJEUndiRVpPVWVcweWQy
VkZYRGRCVEhCeVMweERSiSEZXV1d4RlFFtaDRUMcWc0VFU5SINrUlZZVk5SYVhRM1RIQ
mlka3RRwUWtabWFEQXlNemt6YjJ4WWRqaENENNbTlrWkc5WmVHcENWNQzkxVEhSNFdEW
nVjR0Y2ZEM5VlFYbGtaREZ2UVRsSFZqbEdURXhhJS3pRNE1HaHlNMEpZTnpaTlEzQn
ViRkZ1UVRSSS2JqUTNOWEpyZWxSVGlJFeHdWR0prYUVVOSE9YUlJWRU54ZEdSsNWVWUm
1TSHBSUjJKbk0zcE1NazF1VWxGaVNOXcGhNV3RsU2xNeFRteHlSVWwyYzJFeVVXOXJ
aVUpwWYUdVNFUwUkNhRWt4TnpBMVdsRnNVRlJzkNTkZsNVVVEVTBlRTE0YWtaTGNYWk5
SekUzVTB0TGIxQklTek5qVFhKdlRHNWFVV1p5Ym1oS0wwaElkV2wyYlZWclptVjJW
MWcyYzB4dFpHZ3pTVXRvYTFGVFFWc1kyWXhjaII0UWpFMlNXTjZZVzExY2pZclVwOTZT
RUY2YW14cWJVZFdVa3R3WnowOQ==

-continued

```
hello, jo!
----------------------- Response -----------------------
< Status Code: 200
```

In some cases, an ACS server may require a query string be extracted from ACS content write URL and post to the request body, prior to the actual content (e.g., "Hello, jo!").

By content upload completion, an ACS server, a REST server, and a content server need to coordinate to complete the document update (see, for example, steps 515, 516, and 517 described above with reference to FIG. 5). As an example, in some embodiments, in steps 512 and 513, the REST server appends a query parameter "completionUrl" to the ACS content write URL. The completionUrl is communicated to the ACS server by the REST client in the ACS content write URL. When the REST client completes content upload, the ACS server sends ACS completion request to the REST server, using this completionUrl. The REST server sends the request binary to DFC to complete the post-upload document update. Accordingly, the REST server can expose a new endpoint for the ACS server to send the completion request, for example:

POST/dctm-rest/dc-completion?dc-token=XYZ

Figure 6:
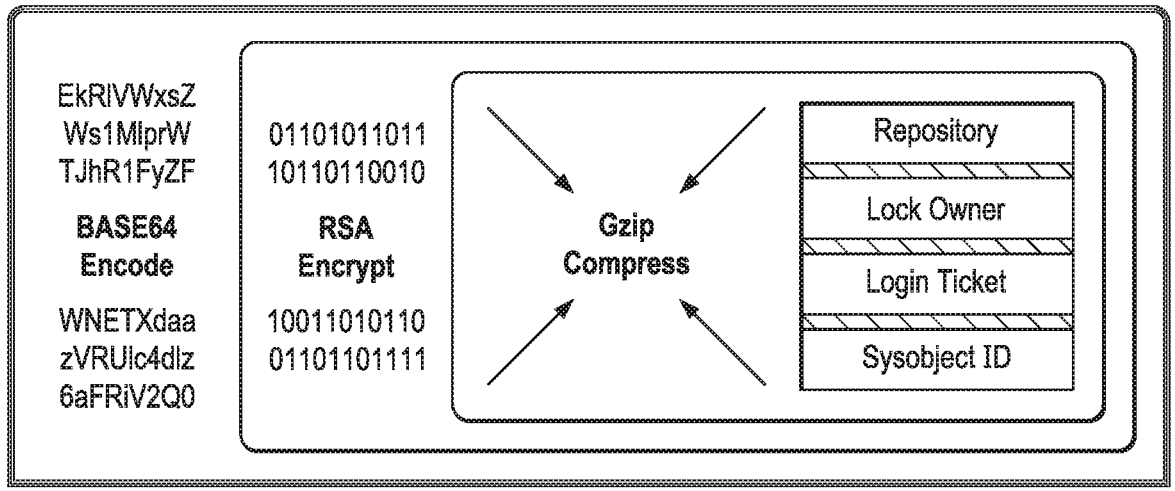
FIG. 6 depicts a diagrammatic representation of an example format of a token generated by a REST server for internal consumption according to some embodiments.

The URI is for anonymous access from the ACS server, but the parameter "dc-token" contains all the information that the REST server needs to determine the user credential and document ID. The token is generated by the REST server and consumed by the REST server only. A non-limiting example of a dc-token format is provided in FIG. 6. The entire completion URL (e.g., the "completionUrl" query parameter) should be encrypted by the REST server and decrypted by the ACS server since it is not intended to be read and abused by any other entities. In some cases, the "completionUrl" query parameter may be BASE64 encoded in the ACS content write URL. Other encryption methods may also be used.

Figure 7:
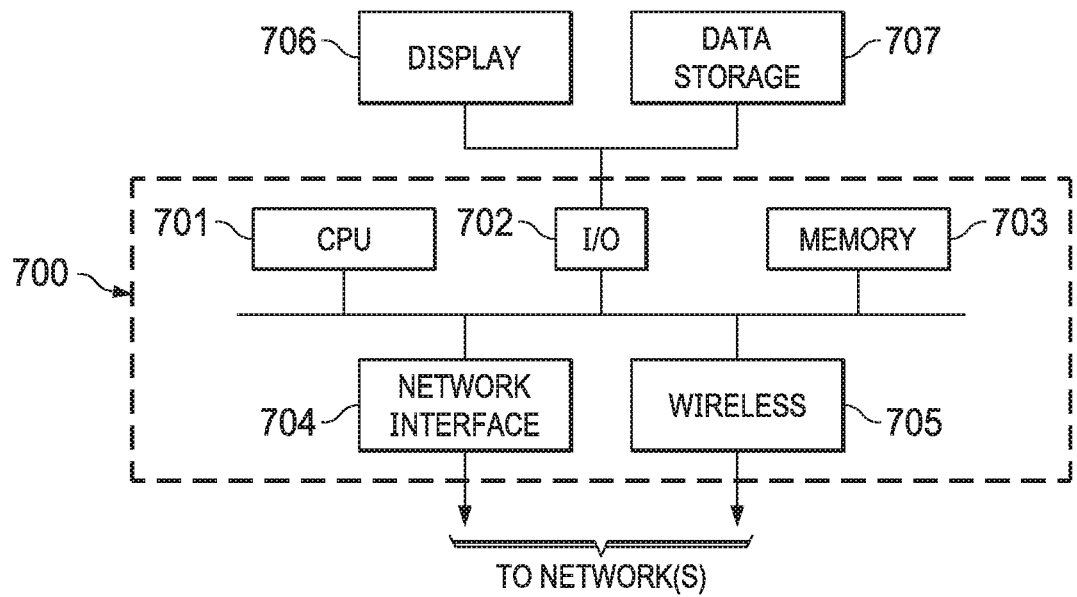
FIG. 7 depicts a diagrammatic representation of an example of a data processing device that may be used to implement a client or server machine according to some embodiments.

FIG. 7 depicts a diagrammatic representation of an example data processing device that may be used to implement a client computing device or a server computer in accordance with embodiments disclosed herein. As shown, data processing system 700 may include one or more central processing units (CPU) or processors 701 coupled to one or more user input/output (I/O) devices 711 and memory devices 703. Examples of I/O devices 711 may include, but are not limited to, keyboards, displays, monitors, touch screens, printers, electronic pointing devices such as mice, trackballs, styluses, touch pads, or the like. Examples of memory devices 703 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 700 can be coupled to display 713, information device 707 and various peripheral devices (not shown), such as printers, plotters, speakers, etc. through I/O devices 711. Data processing system 700 may also be coupled to external computers or other devices through network interface 709, wireless transceiver 705, or other means that is coupled to a network such as a LAN, WAN, or the Internet.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

Although the invention has been described with respect to specific embodiments thereof, these embodiments are merely illustrative, and not restrictive of the invention. Rather, the description is intended to describe illustrative embodiments, features, and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. In general, the functions of the invention can be achieved by, for example, distributed, or networked systems, components, and circuits. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

As used herein, the term "document" refers broadly to any data, including managed content objects. Example documents may include, without limitation, spreadsheets, source code, electronic slideshows, digital images, word processor documents, text files, digital videos, digital audio recordings, e-mails, digital calendar entries, etc.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for geo-aware content transfer, comprising:
   receiving, by a server computer, a representational state transfer (REST) application programming interface (API) request from a client device for an upload link, the REST API request containing a network location associated with the client device;
   obtaining, by the server computer using the network location associated with the client device, a upload universal resource locator (URL) targeting a caching server that is geographically closest to the network location associated with the client device;
   constructing, by the server computer, an upload link containing the upload URL and a completion callback parameter;
   sending the upload link to the client device, wherein the client device uses the upload URL in the upload link constructed by the server computer to upload content to the caching server and, in response, the caching server interprets the completion callback parameter in the upload link to obtain a completion URL targeting the server computer and, upon completion of the uploading of the content from the client device, makes a REST API call to the server computer using the completion URL;
   responsive to the REST API call by the caching server, executing, by the server computer or another server computer in a cluster with the server computer, an inbound operation to complete the uploading of the content to a content management system, the inbound operation including associating the content with a content URL in the content management system; and
   returning the content URL to the caching server, the returning performed by the server computer, wherein the caching server sends the content URL to the client device.

2. The method according to claim 1, wherein the obtaining comprises sending, by the server computer, the network location associated with the client device to an accelerated content services (ACS) server, wherein the ACS server is co-located with the content management system on a server machine, and wherein the ACS server is operable to determine the upload URL based on the network location associated with the client device and return the upload URL to the server computer.

3. The method according to claim 1, wherein the upload URL is one of a plurality of upload URLs determined by an accelerated content services (ACS) server co-located with the content management system on a server machine, and wherein the server computer is operable to determine the upload URL from the plurality of upload URLs determined by the ACS server.

4. The method according to claim 1, wherein the REST API request from the client device contains a file size for the content and wherein the caching server is configured for verifying the file size.

5. The method according to claim 1, wherein the completion callback parameter is encrypted in the upload link constructed by the server computer so that the client device cannot view or modify the completion callback parameter.

6. The method according to claim 1, wherein the server computer is communicatively connected to the client device and the caching server over a wide area network in an enterprise computing environment and to the content management system over a local area network in the enterprise computing environment.

7. The method according to claim 1, wherein the content URL associates the content with a file in the content management system.

8. A system for geo-aware content transfer, comprising:
   a processor;
   a non-transitory computer-readable medium; and
   stored instructions translatable by the processor to perform:
   receiving a representational state transfer (REST) application programming interface (API) request from a client device for an upload link, the REST API request containing a network location associated with the client device;
   obtaining, using the network location associated with the client device, a upload universal resource locator (URL) targeting a caching server that is geographically closest to the network location associated with the client device;
   constructing an upload link containing the upload URL and a completion callback parameter;
   sending the upload link to the client device, wherein the client device uses the upload URL in the upload link to upload content to the caching server and, in response, the caching server interprets the completion callback parameter in the upload link to obtain a completion URL and, upon completion of the uploading of the content from the client device, makes a REST API call using the completion URL;
   responsive to the REST API call by the caching server, executing an inbound operation to complete the uploading of the content to a content management system, the inbound operation including associating the content with a content URL in the content management system; and returning the content URL to the caching server which sends the content URL to the client device.

9. The system of claim 8, wherein the obtaining comprises sending the network location associated with the client device to an accelerated content services (ACS) server, wherein the ACS server is co-located with the content management system on a server machine, and wherein the ACS server is operable to determine the upload URL based on the network location associated with the client device.

10. The system of claim 8, wherein the upload URL is one of a plurality of upload URLs determined by an accelerated content services (ACS) server co-located with the content management system on a server machine, and wherein the stored instructions are further translatable by the processor to perform determining the upload URL from the plurality of upload URLs determined by the ACS server.

11. The system of claim 8, wherein the REST API request from the client device contains a file size for the content and wherein the caching server is configured for verifying the file size.

12. The system of claim 8, wherein the completion callback parameter is encrypted in the upload link so that the client device cannot view or modify the completion callback parameter.

13. The system of claim 8, wherein the processor is communicatively connected to the client device and the caching server over a wide area network in an enterprise computing environment and to the content management system over a local area network in the enterprise computing environment.

14. The system of claim 8, wherein the content URL associates the content with a file in the content management system.

15. A computer program product for geo-aware content transfer, the computer program product comprising a non-transitory computer-readable medium storing instructions translatable by a server computer to perform:

receiving a representational state transfer (REST) application programming interface (API) request from a client device for an upload link, the REST API request containing a network location associated with the client device;

obtaining, using the network location associated with the client device, a upload universal resource locator (URL) targeting a caching server that is geographically closest to the network location associated with the client device;

constructing an upload link containing the upload URL and a completion callback parameter;

sending the upload link to the client device, wherein the client device uses the upload URL in the upload link to upload content to the caching server and, in response, the caching server interprets the completion callback parameter in the upload link to obtain a completion URL and, upon completion of the uploading of the content from the client device, makes a REST API call using the completion URL;

responsive to the REST API call by the caching server, executing an inbound operation to complete the uploading of the content to a content management system, the inbound operation including associating the content with a content URL in the content management system; and returning the content URL to the caching server which sends the content URL to the client device.

16. The computer program product of claim 15, wherein the obtaining comprises sending the network location associated with the client device to an accelerated content services (ACS) server, wherein the ACS server is co-located with the content management system on a server machine, and wherein the ACS server is operable to determine the upload URL based on the network location associated with the client device and return the upload URL to the server computer.

17. The computer program product of claim 15, wherein the upload URL is one of a plurality of upload URLs determined by an accelerated content services (ACS) server co-located with the content management system on a server machine, and wherein the instructions are further translatable by the server computer to perform determining the upload URL from the plurality of upload URLs determined by the ACS server.

18. The computer program product of claim 15, wherein the REST API request from the client device contains a file size for the content and wherein the caching server is configured for verifying the file size.

19. The computer program product of claim 15, wherein the completion callback parameter is encrypted in the upload link so that the client device cannot view or modify the completion callback parameter.

20. The computer program product of claim 15, wherein the server computer is communicatively connected to the client device and the caching server over a wide area network in an enterprise computing environment and to the content management system over a local area network in the enterprise computing environment.

* * * * *

UNITED STATES PATENT AND TRADEMARK OFFICE
CERTIFICATE OF CORRECTION

Page 1 of 3

PATENT NO. : 10,972,570 B2
APPLICATION NO. : 15/979241
DATED : April 6, 2021
INVENTOR(S) : Wei Zhou et al.

It is certified that error appears in the above-identified patent and that said Letters Patent is hereby corrected as shown below:

In the Specification

Column 1, Line 51, replace "BOOS" with -- BOCS --.

Column 1, Line 61, replace "BOOS" with -- BOCS --.

Column 1, Line 63, replace "BOOS" with -- BOCS --.

Column 2, Line 5, replace "BOOS" with -- BOCS --.

Column 2, Line 37, replace "BOOS" with -- BOCS --.

Column 4, Line 57, replace "BOOS" with -- BOCS --.

Column 4, Line 63, replace "BOOS" with -- BOCS --.

Column 4, Line 64, replace "BOOS" with -- BOCS --.

Column 5, Line 2, replace "BOOS" with -- BOCS --.

Column 5, Line 46, replace "BOOS" with -- BOCS --.

Column 5, Line 56, replace "BOOS" with -- BOCS --.

Column 5, Line 58, replace "BOOS" with -- BOCS --.

Column 7, Line 7, replace "BOOS" with -- BOCS --.

Column 7, Line 10, replace "BOOS" with -- BOCS --.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,972,570 B2

Column 7, Line 12, replace "BOOS" with -- BOCS --.

Column 7, Line 15, replace "BOOS" with -- BOCS --.

Column 7, Line 17, replace "BOOS" before "server" with -- BOCS -- and replace "BOOS" after "advanced" with -- BOCS --.

Column 7, Line 19, replace "BOOS" with -- BOCS --.

Column 7, Line 21, replace "BOOS" with -- BOCS --.

Column 7, Line 23, replace "BOOS" with -- BOCS --.

Column 7, Line 26, replace "BOOS" with -- BOCS --.

Column 7, Line 29, replace "BOOS" with -- BOCS --.

Column 7, Line 42, replace "BOOS" with -- BOCS --.

Column 7, Line 49, replace "BOOS" with -- BOCS --.

Column 7, Line 51, replace "BOOS" with -- BOCS --.

Column 7, Line 52, replace "BOOS" with -- BOCS --.

Column 8, Line 9, replace "BOOS" with -- BOCS --.

Column 8, Line 13, replace "BOOS" with -- BOCS --.

Column 8, Line 14, replace "BOOS" with -- BOCS --.

Column 8, Line 20, replace "BOOS" with -- BOCS --.

Column 8, Line 22, replace "BOOS" with -- BOCS --.

Column 8, Line 23, replace "BOOS" with -- BOCS --.

Column 8, Line 24, replace "BOOS" with -- BOCS --.

Column 8, Line 27, replace "BOOS" with -- BOCS --.

Column 8, Line 38, replace "BOOS" with -- BOCS --.

Column 8, Line 44, replace "BOOS" with -- BOCS --.

Column 8, Line 45, replace "BOOS" with -- BOCS --.

CERTIFICATE OF CORRECTION (continued)
U.S. Pat. No. 10,972,570 B2

Column 8, Line 46, replace "BOOS" with -- BOCS --.

Column 8, Line 49, replace "BOOS" with -- BOCS --.

Column 8, Line 50, replace "BOOS" with -- BOCS --.

Column 9, Line 27, replace "BOOS" with -- BOCS --.

Column 9, Line 33, replace "BOOS" with -- BOCS --.

Column 9, Line 38, replace "BOOS" with -- BOCS --.

Column 9, Line 40, replace "BOOS" with -- BOCS --.

Column 9, Line 44, replace "BOOS" with -- BOCS --.

Column 9, Line 46, replace "BOOS" with -- BOCS --.

Column 9, Line 47, replace "BOOS" with -- BOCS --.

Column 10, Line 43, replace "BOOS" with -- BOCS --.

Column 10, Line 44, replace "BOOS" with -- BOCS --.

Column 10, Line 64, replace "BOOS" with -- BOCS --.

Column 13, Line 9, replace "BOOS" with -- BOCS --.